United States Patent [19]

Tanaka et al.

[11] Patent Number: 5,242,717
[45] Date of Patent: Sep. 7, 1993

[54] METHOD OF PRODUCING A COMPOSITE SLIDING MEMBER

[75] Inventors: Tadashi Tanaka, Konan; Masaaki Sakamoto, Nagoya; Hideyuki Kidokoro, Komaki, all of Japan

[73] Assignee: Daido Metal Company Ltd., Nagoya, Japan

[21] Appl. No.: 979,488

[22] Filed: Nov. 20, 1992

Related U.S. Application Data

[62] Division of Ser. No. 797,885, Nov. 26, 1991, abandoned.

[30] Foreign Application Priority Data

Dec. 27, 1990 [JP] Japan ................................. 2-407853

[51] Int. Cl.⁵ ............................................ B05D 3/06
[52] U.S. Cl. ................................ 427/455; 427/576; 427/500
[58] Field of Search ..................... 427/455, 576, 500

[56] References Cited

U.S. PATENT DOCUMENTS

| | | | |
|---|---|---|---|
| 2,280,103 | 4/1942 | Swartz et al. | 420/474 |
| 2,332,737 | 10/1943 | Marvin et al. | 428/676 |
| 2,386,951 | 10/1945 | Howe | 428/677 |
| 3,720,507 | 3/1973 | Lundin | 420/474 |
| 4,206,268 | 6/1980 | Roemer et al. | 428/676 |
| 4,406,857 | 9/1983 | Mahrus et al. | 420/474 |
| 4,818,628 | 4/1989 | Alexander et al. | 420/474 |
| 4,904,537 | 2/1990 | Lytwynec | 419/29 |

FOREIGN PATENT DOCUMENTS

| | | |
|---|---|---|
| 0005560 | 2/1979 | European Pat. Off. . |
| 52-15416 | 2/1977 | Japan .................................. 428/677 |
| 0410300 | 5/1934 | United Kingdom . |
| 0749721 | 5/1956 | United Kingdom . |
| 1083003 | 9/1967 | United Kingdom . |
| 1456644 | 11/1976 | United Kingdom . |

*Primary Examiner*—Bernard Pianalto
*Attorney, Agent, or Firm*—Browdy and Neimark

[57] ABSTRACT

The present invention relates to a composite sliding member having a backing metal and a sliding layer consisting of lead-containing copper alloy and being bonded to the backing metal, and to the method of producing the same. The present invention resides in more superior sliding performance exhibited due to uniform and fine distribution of lead particles in the copper alloy matrix. The method of the present invention to produce composite sliding members comprises using the atomized powder in which lead particles are finely and uniformly distributed in the alloy matrix and forming a cladding layer as the sliding layer through a plasma arc welding apparatus.

2 Claims, 4 Drawing Sheets

(100 x)

5,242,717

METHOD OF PRODUCING A COMPOSITE SLIDING MEMBER

This application is a division of application Ser. No. 07/797,885 filed Nov. 26, 1991, abandoned.

BACKGROUND OF THE INVENTION

The present invention relates to a composite sliding member used in all kinds of industries, and more particularly to a composite sliding member consisting of a steel backing and a high quality lining of copper-lead alloy or lead-bronze alloy which is formed readily and economically on the steel backing by the plasma arc build up welding method and, to a producing method of the composite sliding member.

Conventional composite sliding members consisting of copper-lead alloy or lead-bronze alloy layer are usually produced by melting and casting those alloys. The conventional method requires a number of processes including casting, and thus are costly.

Alternatively, according to other methods, a copper alloy layer is formed on a steel backing by cladding according to the metal spraying method or the various kinds of build up welding method (TIG welding, arc welding, gas welding, etc.). Those methods have been applied only to produce alloys containing no lead, such as aluminum-bronze, phosphorous bronze and brass except for lead-containing alloys which exhibit superior friction properties. The reasons, why the metal spraying and the build up methods are not in general applied to lead-containing alloys, are that harmful lead evaporation is generated during the metal spraying process or the welding process, the yield of lead is low and the lead segregates to an extreme degree in the alloy. Thus, the cladding method of metal spraying or build up welding is applied to the copper alloys with no lead, such as aluminum-bronze, phosphorous bronze and brass.

The method of producing composite sliding members by means of the casting process requires the dangerous and hard work at a high temperature. Because the melting temperature of copper-lead alloy and lead-bronze alloy, in particular, is above 1000° C., harmful lead fumes are generated so that the working environment is very poor. Controlling of casting condition is difficult which requires the experience of skilled workers.

Excluding the products with lining on an inner surface of a backing metal by means of the centrifugal casting process, the set up of a stopper (or a weir) for molten metal is required in case of gravity casting on a thrust face or for lining of the outer surface of the backing metal in order to prevent molten metal from flowing out from the backing metal, so the preparations for casting require great expense.

In order to produce normal castings without a blow hole by means of casting, a riser with a height of several times as large as a thickness of a product lining is required, which causes a reduction in the yield and increases production cost.

In case of casting on a surface of a housing with a complicated form, a non-uniform structure and segregation of the cast alloy, or a poor bonding to the housing are apt to occur due to non-uniform cooling.

According to casting processes, even in the case where a lining is required on a mere small part of a product, the entire backing metal in must be provided with a lining and then the mostly unnecessary part thereof must be cut off, resulting in the low yield which is not economical.

On the other hand, the methods of producing composite sliding members by means of metal spraying or the welding are free from the high-temperature work involved in casting, and relatively easy methods for cladding by build up welding of high melting point metals. However, the metal spraying or the welding of lead-containing alloys exhibiting excellent friction property, is very harmful because of the evaporation of the lead at the metal spraying or welding process. Further, according to those processes, the yield of lead is so low that objective compositions cannot be obtained, and a uniform and fine structure cannot be produced due to much lead segregations. Thus, the properties of composite sliding members, which are required to have a high speed and a greater specific load, cannot be improved.

SUMMARY OF THE INVENTION

A primary object of the present invention is to solve at least a part of the problems described above and to provide a composite sliding member having a sliding layer composed of lead-containing copper alloy as well as the method of producing the same.

The composite sliding member of the present invention comprises a backing metal and a sliding layer bonded to the backing metal characterized in that the sliding layer consists of a copper alloy having a thickness of 0.2 to 4 mm and containing 5 to 40 wt. % of lead, that the lead is present as fine particles uniformly distributed in the copper alloy matrix, and that 80% or more of the total lead particles are particles each of which has a diameter of 50 micron or less.

The method of producing a composite sliding member in accordance with the present invention comprises the step of preparing the copper alloy powder containing 5 to 40 wt. % of lead being fine and distributed uniformly and a backing metal, and the step of thermally bonding the copper alloy powder to the backing metal in a non-oxidative atmosphere by the plasma arc cladding by build up welding to produce a sliding layer with a structure in which lead is finely and uniformly distributed in the copper alloy matrix.

DETAILED DESCRIPTION OF THE INVENTION

Figure 1:
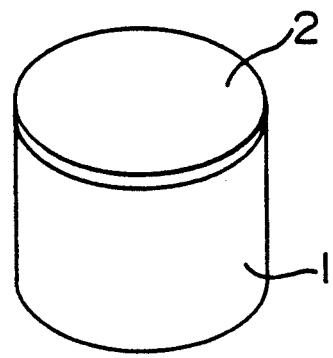
FIG. 1 is a perspective view of the composite sliding member of Example 1.

The present inventors thought that the plasma arc cladding by build up welding method is available to solve the problems with respect of the casting process or the metal spraying process. That is, a voltage is applied between a torch and a backing metal, followed by flowing of argon gas to generate plasma arc at a high temperature, into which a bearing alloy powder or wire is fed and melted on the surface of the backing metal so that a bearing alloy layer is formed on the backing metal.

As a similar cladding by build up welding method, there are TIG welding, arc welding, gas welding and the like. According to such welding methods, however, iron in the backing metal is dissolved into a bearing alloy and adversely affects the bearing alloy. In the case of the cladding by build up welding of a low-melting metal such as bearing alloys, the dissolution of iron into a bearing alloy is prevented by utilizing a soft plasma according to the plasma arc cladding by build up welding method. According to the plasma arc method, the oxidation of the molten metal is prevented by a shield gas such as argon whereby a normal cladding by build up welding is effected.

However, even in the case of the plasma arc cladding by build up welding method, lead readily evaporates when a mixture of a copper alloy powder and lead alloy powder is utilized as a raw material powder. Under the recognition of this, it was found that such lead evaporation is suppressed by using a powder in each particle of which lead is uniformly and finely distributed in a copper alloy, thereby producing a sliding layer with lead in uniform distribution.

The effects of the present invention will now be explained hereinafter with reference to conventional methods.

According to the plasma arc cladding by build up welding of the present invention, an automatic or a remote controlled operation can be realized whereby workers may be released from a hard work at a high-temperature and in an inferior environment such as in the casting work. Once a condition of cladding by build up welding is predetermined, cladding by the build up welding is automatically carried out to produce a high-quality product in a stable manner, without requiring the experience of skilled workers. According to the plasma arc welding, method there is no need to place a weir onto a backing metal or no need to effect sealing in order to prevent flowing out of molten melt, as is the case in the casting, so a free cladding by build up welding is possible. For the products with the thrust surface to be provided with gravity casting or an outer surface lining, the number of processes can be reduced as to be economical. Even in the case of effecting a lining on a more small portion of the backing metal, a free cladding by build up welding on a necessary portion is possible and is economical, because it does not require to cut off much unnecessary parts thereof after lining of its entire surface as is in the process of casting. In the case of casting, a riser with a height of several times as large as a thickness of a product lining is required. On the other hand, according to the present invention, it is merely required to remove a slag layer of about 1mm, which can avoid waste of an expensive bearing alloy and is economical. In case that a lining is effected onto a backing metal with a complicated form by means of casting process, uniform and rapid cooling of the cast lining is hard which delays solidification, resulting in generating shrinkage blow hole, a non-uniform structure and segregation, namely a non-uniform solidification, so that non-uniform shrinking forces act on the interface of the lining and the backing metal as to cause an inperfect bonding of the both materials. In the present invention, however, a specific cooling is not required, so that a product with a stable quality can be obtained.

Further, according to the present invention, because of the use of the atomized powder in each particle of which minute lead particles are uniformly distributed, lead does not evaporate during the build up welding, differing from various kinds of the welding methods using a blended powder of lead powder and a copper alloy powder or from the metal spraying method. In the invention, because lead-containing copper alloys such as a copper-lead alloy or a lead-bronze alloy can be used, the properties of seizure resistance, load resistance and the like can be remarkably improved as compared with the case of the composite sliding members produced by the metal spraying or the usual welding in which only brass or bronze is used. According to the metal spraying method, the bonding force between a lining and a backing metal is weak because the bonding depends upon an anchoring effect at spraying, and the mutual connecting of alloy particles is insufficient because the particles are bonded via oxide films which are produced by oxidation of molten particles during spraying in air. Because the powder is melted in argon atmosphere by plasma arc in the case of the present invention, the bonding between a backing metal and drops of molten alloy and the mutual connecting of the molten alloy drops are respectively complete. In the invention, the frictional property is inferior at the level of less than 5% of lead in the copper alloy, while the alloy strength and the corrosion resistance are deteriorated at the level of 40% or more of lead in the copper alloy.

EXAMPLE

Figure 6:
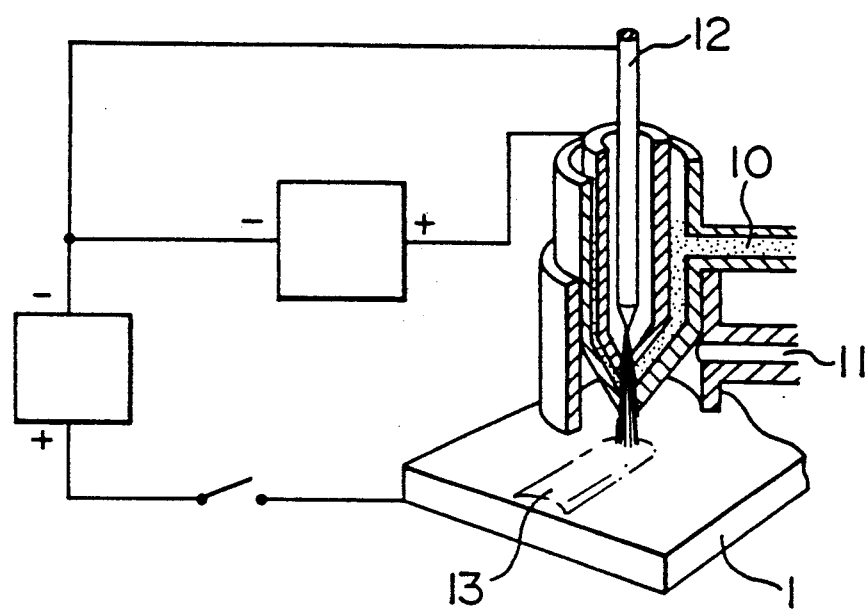
FIG. 6 is a cross sectional view of the plasma arc welding apparatus used in the present invention in the state of operation.
Figure 7:
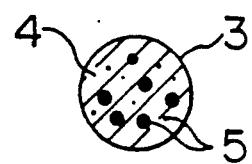
FIG. 7 is a cross sectional view of a particle of the atomized powder used in the present invention.

Some experiments were carried out with a plasma arc welding apparatus shown in FIG. 6. In the plasma arc welding apparatus shown in FIG. 6, when a powder of lead-containing copper alloy which was produced by the atomizing process, having a particle size of 80 to 200 mesh (75 to 177 μm), is fed from a powder supply port 10 into the plasma arc welding apparatus by means of a carrier gas, and argon gas is simultaneously fed therein from a shield gas supply port 11. A voltage is also applied between a backing metal 1 and a tungsten electrode 12 generates plasma arc so that molten lead-containing copper alloy is deposited on the backing metal as to form a cladding layer (or build up layer) 13. Each particle 3 of lead-containing copper alloy powder has a nearly spherical form, and has a structure where minute lead particles 5 are uniformly distributed in the copper-alloy matrix 4 of a particle of the powder as is shown in FIG. 7 illustrating a cross sectional schematic view of the particle.

EXAMPLE 1

As is shown in FIG. 1, a lead-bronze alloy (Cu-10% Pb-10% Sn) layer 2 of a thickness of 3 mm was subjected to the cladding by build up welding on the end face of a columnar backing metal 1 (JIS S45C) of 200 mm diameter and 150 mm height by means of the plasma arc welding apparatus shown in FIG. 6. That is, while backing metal 1 placed on a rotary table was in rotation, a torch was moved radially from the center of the table to the peripheral edge so that a lining operation is spirally carried out. A powder of a lead-bronze alloy (Cu - 10% Pb - 10% Sn) which was produced by the atomizing process was fed into the plasma arc generated between the torch and the backing metal 1, and was melted under an argon gas atmosphere to form the layer 2 on the backing metal 1.

After the cladding by build up welding, a top surface portion of the layer 2 was cut off at 1 mm depth to remove slag for a penetration test. Consequently, no defect including a blow hole were not found in the layer 2. The test of inspecting a bonding soundness was carried out by forcibly inserting a chisel between the layer 2 and the backing metal 1 in order to confirm whether the build up layer 2 is separated or not from the backing metal. No separation was found and the bonding state was excellent. A hardness and a bonding strength were subsequently examined. Consequently, the hardness and the bonding strength were excellent, that is HV 90 and 22 kgf/mm$^2$, respectively, with no difference compared with a cast alloy. As a result of an analysis of the alloy layer 2, the composition was about the same as the supplied raw powder. As to the structure of the lead-containing copper alloy of the layer 2, lead was uniformly and finely distributed in the copper-alloy matrix (see FIG. 8).

A seizure test of the sliding member thus obtained was carried out to examine the seizure resistance. The maximum specific load without seizure was as excellent as about 650 kgf/cm$^2$. The cladding by build up welding was also effected on a spherical surface of a cylindrical backing metal. The result was satisfactory.

On the other hand, in the case where a blended powder composed of a copper powder, a lead powder and a tin powder (comparative Specimen 3), of which composition is identical to that of the lead-bronze powder mentioned above, was used in the plasma arc build up welding, an aimed composition could not be obtained due to evaporation of lead. In this case, an uniform structure could not be also obtained because lead segregated. Further, as to the seizure resistance, the maximum specific load for Specimen 3 was about 350 kgf/cm$^2$ which was inferior to that of the products of the present invention (see Table 1).

After machining processes, the product of the present invention can be applied to a cylinder block of an oil pressure unit.

EXAMPLE 2

Figure 2:
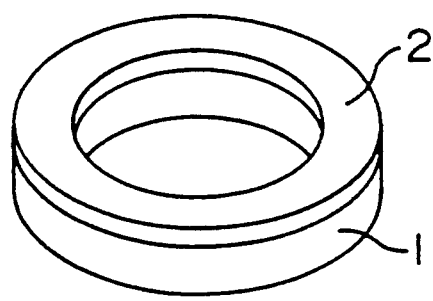
FIG. 2 is a perspective view of the composite sliding member of Example 2.

As is shown in FIG. 2, a lead-copper alloy layer 2 (Cu - 23% Pb - 3% Sn) was formed on the top surface of a ring-like shaped backing metal 1 (JIS S15C) of 30 mm thickness, 400 mm outer diameter and 300 mm inner diameter by the plasma arc build up welding. While the backing metal 1 placed on a rotary table as in Example 1 was in rotation, the torch of the plasma arc welding apparatus was moved from the center of the table to the peripheral edge so that a lining operation is spirally carried out in order to form the layer 2 of 3 mm thickness on the backing metal 1. As a powder, a powder of lead-bronze alloy (Cu - 23% Pb - 3% Sn) which was produced by the atomizing process was used. After the cladding by build up welding, a top surface portion of the layer 2 was cut off at 1 mm depth to remove slag for a penetration test. It was found consequently that the cladding by build up welding was successfully done since no defect such as a blow hole existed. A chisel was tried to insert between the layer 2 and the backing metal 1 to carry out a test of inspecting a bonding soundness. The test result was satisfactory like in Example 1. A hardness and a bonding strength were subsequently examined. The examined properties were good, since there was no difference between the properties and that of a cast alloy (a casting). As to the structure of the lead-bronze alloy layer 2 bonded to the backing metal 1 lead was uniformly and finely distributed in the alloy matrix. As a result of an analysis of the alloy layer 2, the composition was about the same as that of the supplied raw powder. At a seizure test carried out in the same manner as in Example 1, the maximum specific load of about 700 kgf/cm$^2$ was obtained (see Table 1).

After machining processes, the product of the present invention can be applied to a thrust washer of a marine engine.

On the other hand, in the case where a blended powder composed of a lead powder and a bronze alloy powder, of which composition is identical to that of the lead-bronze powder mentioned above, was used in the casting (comparative specimen 2) and the plasma arc build up welding (comparative specimen 4), the examined maximum specific loads were lower than that in the Example 2 of the present invention (see Table 1).

EXAMPLE 3

Figure 3:
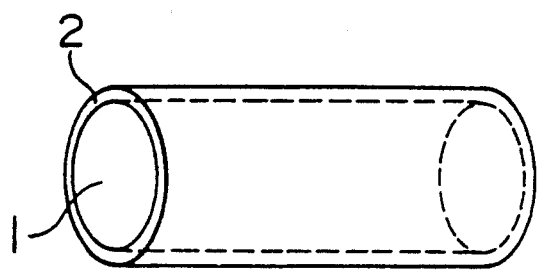
FIG. 3 is a perspective view of the composite sliding member of Example 3.

As is shown in FIG. 3, a copper lead alloy layer 2 (JIS KJ3) was formed on the circumferential surface of a cylindrical solid backing metal 1 (JIS S15C) of an outer diameter of 100 mm and 200 mm length. In the welding process, the backing metal 1 was positioned on a rotation device and rotated in horizontal position around the axis thereof, while a torch of a plasma arc welding apparatus was then moved horizontally from one end to the other along the outer surface of the backing metal 1 as to spirally form the alloy layer 2 of 3 mm thickness on the circumferential outer surface of the backing metal 1. Into plasma arc generated between the torch and the packing metal 1, an alloy powder of the copper-lead alloy (JIS KJ3), which was produced by the atomizing process, was fed and melted to effect the cladding by build up welding under the protective atmosphere of argon gas.

Figure 8:
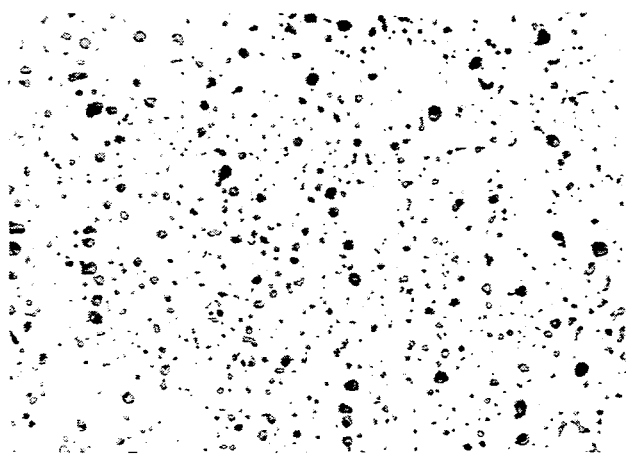
FIG. 8 is a microscopic photograph of the structure of the sliding layer of the composite sliding material at a magnification of 100.

After the build up welding, a top surface portion of the layer 2 was cut off at 1 mm depth to remove slag for a penetration test. Consequently, it was found that the build up welding was successfully done since no defect such as a blow hole existed. A chisel was tried to insert between the alloy layer 2 and the backing metal 1 to carry out a test of inspecting a bonding soundness. The test result was good. A hardness and a bonding strength were subsequently examined. The examined properties were also good, since there was no difference between the properties and that of a cast alloy (a casting). As to the structure of the alloy layer 2, lead was uniformly and finely distributed in the alloy matrix. The structure was essentially the same as the structure as shown in FIG. 8. As a result of an analysis of the alloy layer 2, the composition was about the same as that of the supplied raw powder.

After machining processes, the product of the present invention can be applied to a bearing of a planetary gear in a reduction gears.

EXAMPLE 4

Figure 4:
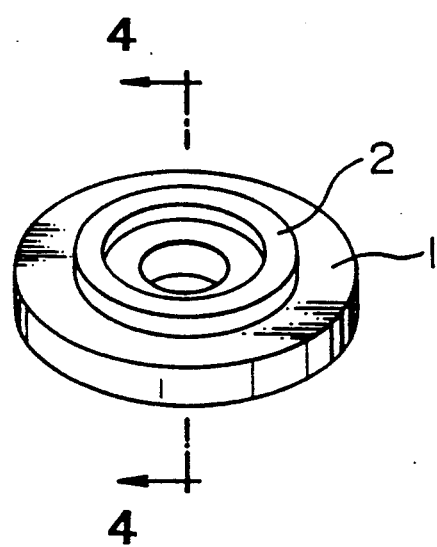
FIG. 4 is a perspective view of the composite sliding member of Example 4.
Figure 5:
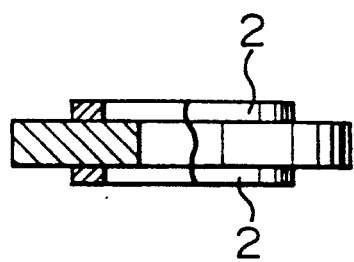
FIG. 5 is a front view, partially cross sectioned along line A—A in FIG. 4, of the composite sliding member.

As are shown in FIGS. 4 and 5, lead-bronze alloy layers 2 (Cu - 10% Pb - 10% Sn) was formed on the both surfaces of a backing metal ring 1 (JIS S15C) of an outer diameter of 50 mm, an inner diameter of 10 mm and 5 mm thickness by the plasma arc build up welding. Each of the formed alloy layers 2 has a ring like shape of an outer diameter of 40 mm and an inner diameter of 30 mm. In the welding process, the backing metal ring 1 was positioned on a rotary table, while a torch of a plasma arc welding apparatus was fixed to effect the build up welding as to form a ring like alloy layer 2 of 5 mm width and 3 mm thickness on the backing metal ring 1. A raw powder of a lead-bronze alloy (Cu - 10% Pb - 10% Sn) was used in the build up welding. The backing metal ring 1 was subsequently turned over in order to effect the next build up welding on opposite side surface thereof.

After the build up welding, a top surface portion of each of the alloy layers 2 was cut off at 1 mm depth to remove slag for a penetration test. It was found consequently that the build up welding was successfully done since no defect such as a blow hole existed. A chisel was tried to insert between the alloy layer 2 and the backing metal ring 1 to carry out a test of inspecting a bonding soundness. The test result was good. A hardness and a bonding strength were subsequently examined. The examined properties were also good, since there was no difference between the properties and that of a cast alloy (a casting). As a result of an analysis of the alloy layer 2, the composition was about the same as that of the supplied raw powder. The structure of the alloy layer 2 was essentially the same as the structure of FIG. 8 in which lead was uniformly and finely distributed in the alloy matrix.

After machining processes, the product of the present invention can be applied to a thrust washer of a turbocharge, both of which surfaces are used as a bearing surface.

In the examples described above, the build up alloy layers were 2 mm and 3 mm thick. It is also possible to form a build up layer with a larger thickness layered cladding by the plasma arc build up welding. The thickness of the build up layer is preferably 1 mm to 10 mm, more preferably 2 mm to 5 mm.

| | -continued |
|---|---|
| Shaft material | JIS S55C |
| Loading manner | The load was increased by 50 kg/cm² step by step, 20 minutes for each load. |

\*\* In comparative specimens 3 and 4, Cu - 10% Sn alloy powder and Pb powder were blended and used in the plasma arc welding.

As will be apparent from the above, according to the present invention, lead-containing copper bearing metal can be easily subjected to cladding by build up welding on a necessary portion of a backing metal in any form, which releases workers from a hard working of casting in an inferior environment such as at a high-temperature. No experience of skilled workers is required, as is the case in casting, and the setting up of the condition enables the production of stable-quality products. There is no need to weld a weir onto a backing metal in order to prevent flowing out of molten melt as is the case in casting, which enables the shortening of such process; no need of a riser enables the saving of alloy, which is economical. Automatic setting and removing of a backing metal and an automatic welding by means of computer control may realize unmanned operation, which can decrease man power and the number of workers, leading to cost down. Using of the atomized powder in each particle of which lead is uniformly and finely distributed can solve the problem of lead evaporation which renders it impossible to obtain the lead component with a predetermined composition and to obtain uniform structures due to the segregation of lead in alloy, as are observed when a blended alloy powder consisting of a copper alloy powder and a lead powder is used, whereby composite sliding members with excellent bearing properties can be produced.

Because a composite sliding member with a lead-containing copper alloy layer(s) can be readily produced in any form, the seizure resistance and the load resistance properties can be improved remarkably, whereby high speed and high power of general industrial machines

TABLE 1

| | | Composition of sliding layer (wt. %) | Seizure Test Method of forming sliding layer | Maximum specific load (kgf/cm²) 300 400 500 600 700 800 |
|---|---|---|---|---|
| Invention Specimen | Example 1 | Cu-10% Sn-10% Pb | Plasma arc welding by using atomized powder | |
| | Example 2 | Cu-3% Sn-23% Pb | | |
| Comparative Specimen | 1 | Cu-10% Sn-10% Pb | Casting | |
| | 2 | Cu-3% Sn-23% Pb | Casting | |
| | \*\*3 | Cu-10% Sn-10% Pb | Plasma arc welding by using a blended powder | |
| | \*\*4 | Cu-3% Sn-23% Pb | Plasma arc welding by using a blended powder | |

Specimens were decided as developed seizure when the temperature of the back surface exceeded 200° C. or when the current of motor exceeded 10A.

\* Condition of the seizure test:

| Shaft diameter | 53 mm |
|---|---|
| Number of rotation | 2,000 rpm |
| Lubricant oil | JIS SAE 20 |
| Flow rate of feed oil | 20 cc/min. | and internal combustion engines can be achieved, with greatly improved performance thereof.

What is claimed is:

1. Method of producing a composite sliding member having a backing metal and a sliding layer bonded to the backing metal wherein the sliding layer consists of a copper alloy of a thickness of 0.2 to 4mm and containing 5 to 40 wt. % of lead and the lead is present as minute particles uniformly distributed in the copper alloy matrix and 80% or more of the total lead particles are particles each of which has a diameter of 50 micron or less, said method comprising:
- a step of preparing a powder of a copper alloy containing 5 to 40% by weight of lead which is uniformly and finely distributed in the copper alloy matrix and a backing metal, and
- a step of thermally bonding the copper alloy powder to the backing metal in a non-oxidative atmosphere by the plasma arc cladding by building up welding to produce a sliding layer with a structure in which lead is finely and uniformly distributed in the copper alloy matrix.

2. A method according to claim 1, wherein said powder is an atomized powder.

* * * * *